(12) United States Patent
Fleming

(10) Patent No.: US 10,378,854 B2
(45) Date of Patent: Aug. 13, 2019

(54) SPECIALIZED UNDERWATER PISTOL AND AMMUNITION FOR ERADICATING LIONFISH

(71) Applicant: Terry L. Fleming, Little Rock, AR (US)

(72) Inventor: Terry L. Fleming, Little Rock, AR (US)

( * ) Notice: Subject to any disclaimer, the term of this patent is extended or adjusted under 35 U.S.C. 154(b) by 0 days.

(21) Appl. No.: 15/796,826

(22) Filed: Oct. 29, 2017

(65) Prior Publication Data

US 2018/0120052 A1    May 3, 2018

Related U.S. Application Data

(63) Continuation of application No. 15/094,896, filed on Apr. 8, 2016, now Pat. No. 9,803,955.

(60) Provisional application No. 62/148,695, filed on Apr. 16, 2015.

(51) Int. Cl.
| | |
|---|---|
| *F41C 9/06* | (2006.01) |
| *F41C 3/14* | (2006.01) |
| *A01K 81/06* | (2006.01) |
| *F42B 7/00* | (2006.01) |
| *F41A 21/16* | (2006.01) |

(52) U.S. Cl.
CPC ............... *F41C 9/06* (2013.01); *A01K 81/06* (2013.01); *F41A 21/16* (2013.01); *F41C 3/14* (2013.01); *F42B 7/00* (2013.01)

(58) Field of Classification Search
CPC ... F41C 9/06; F41C 3/14; A01K 81/06; F41A 21/16; F42B 7/00
USPC .......................................................... 42/1.14
See application file for complete search history.

(56) References Cited

U.S. PATENT DOCUMENTS

| | | | | |
|---|---|---|---|---|
| 2,151,521 A | * | 3/1939 | Manville | F41A 9/85 42/1.08 |
| 3,296,729 A | * | 1/1967 | Stevens, Jr. | F41A 21/06 42/59 |
| 3,401,588 A | * | 9/1968 | Olson | F42B 7/04 102/452 |
| 3,407,526 A | * | 10/1968 | Freed | F41A 21/16 42/59 |
| 2006/0242878 A1 | * | 11/2006 | Dubois | F41A 3/74 42/59 |

* cited by examiner

*Primary Examiner* — Samir Abdosh
(74) *Attorney, Agent, or Firm* — Paul D. Chancellor; Ocean Law

(57) ABSTRACT

A specialized underwater pistol with ammunition includes one or more of barrel expansions to shape the pattern of the plural shot pieces expelled from a pistol cartridge when the pistol is fired, an aerodynamic trigger cam or spur, flushing ports, a wide trigger pull, a wide hammer spur, a cartridge shot carrier with a frangible end, and cartridge sealant.

11 Claims, 15 Drawing Sheets

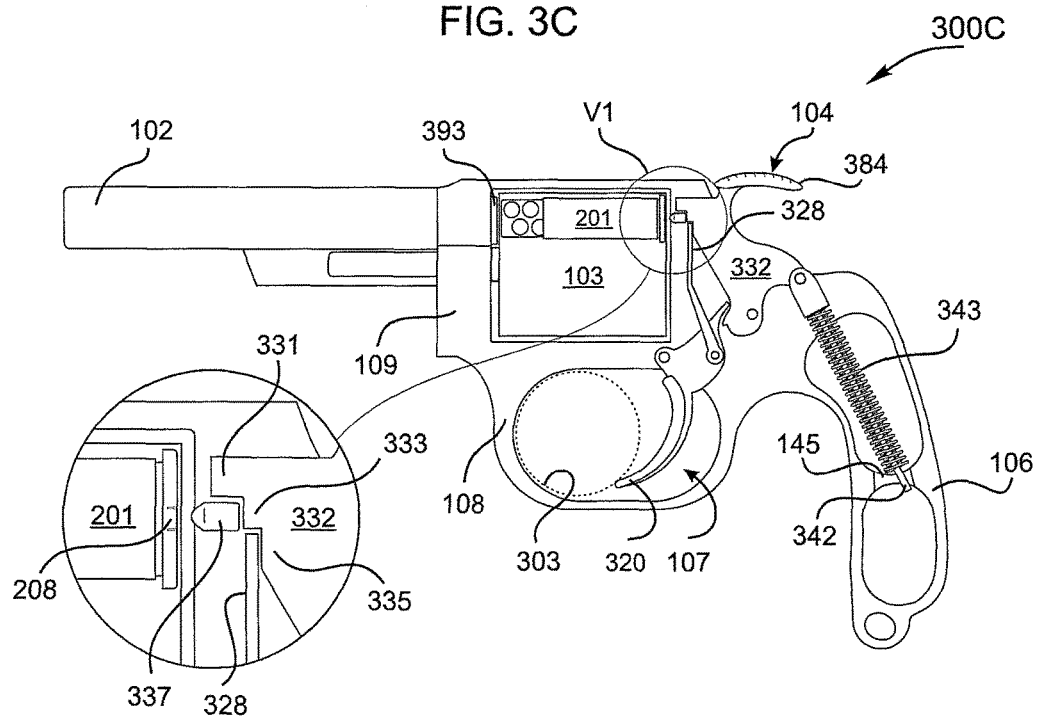
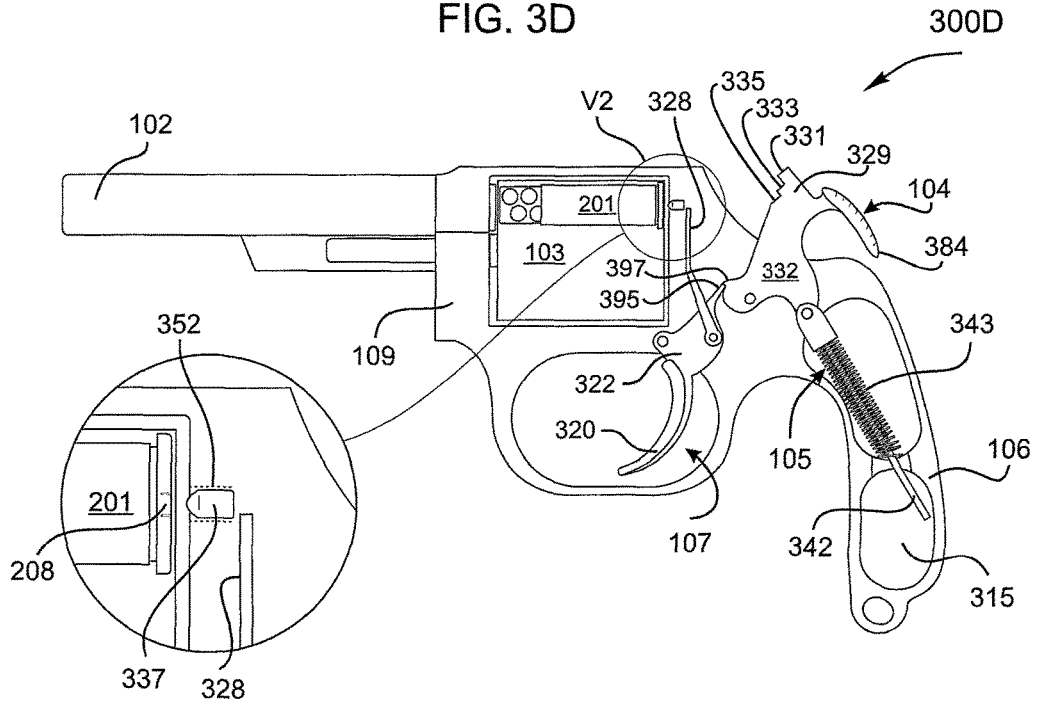

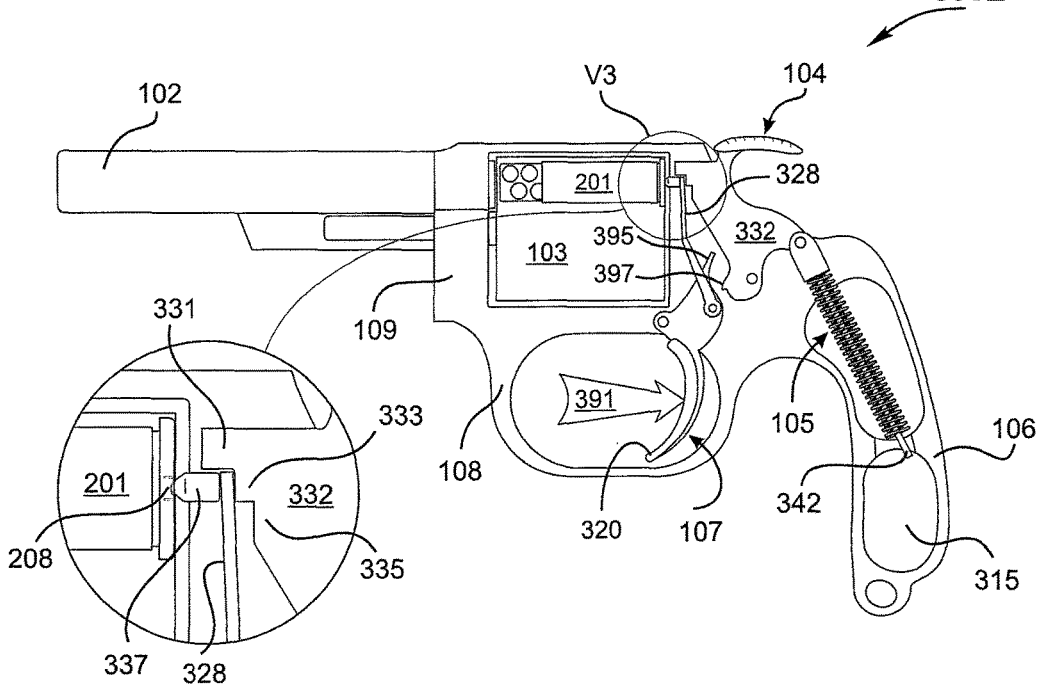
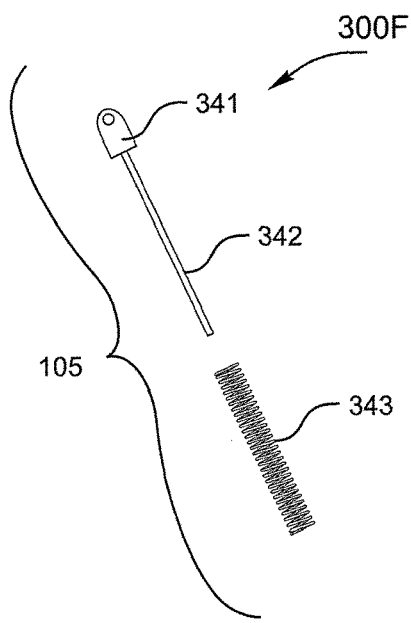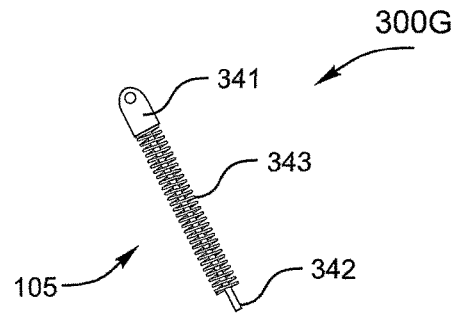

FIG. 3H
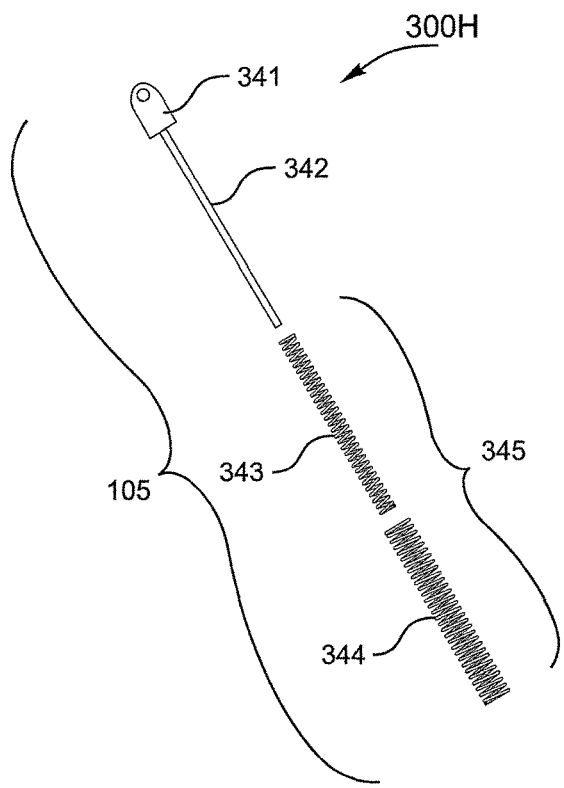
FIG. 3I
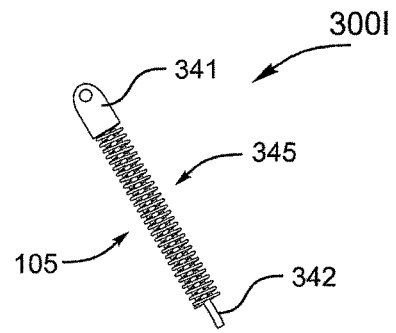
FIG. 3J
| APPLICATION | Single Spring | Nested Springs | |
|---|---|---|---|
| | (spring constant lbf/inch) | Outer Spring (spring constant lbf/inch) | Inner Spring (spring constant lbf/inch) |
| Pistol in air | k | k | |
| Pistol in water | 2k - 2.5k | 1k - 1.25k | 1k - 1.25k |

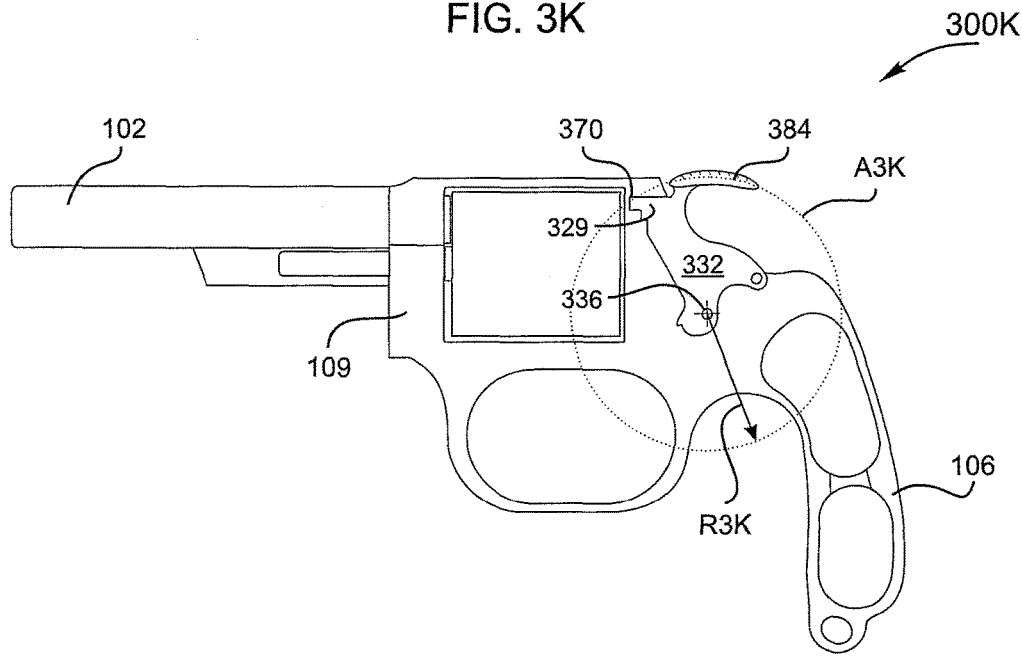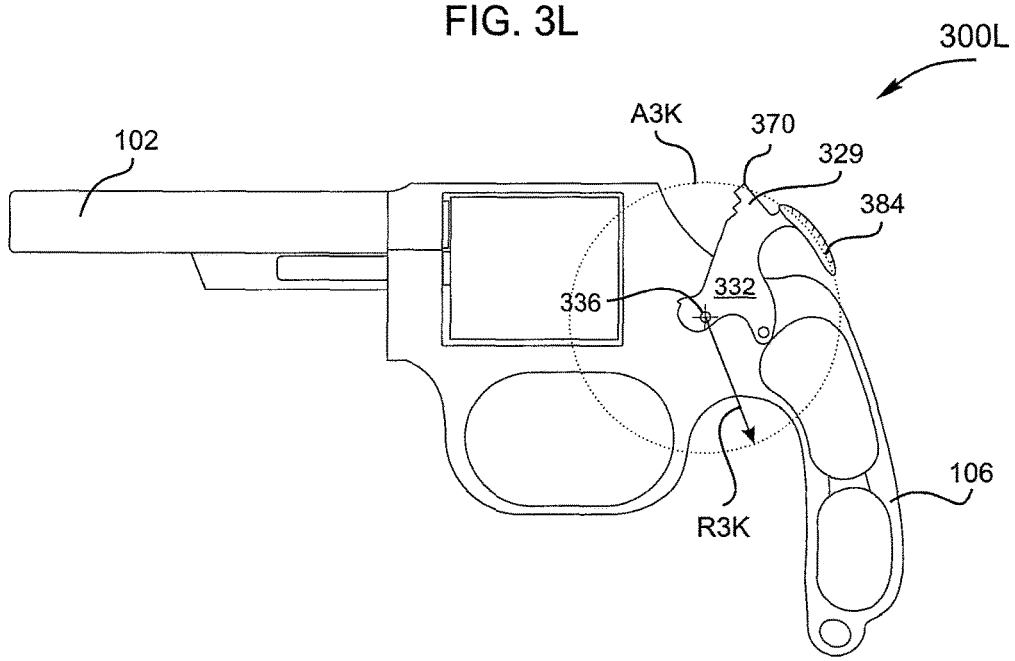

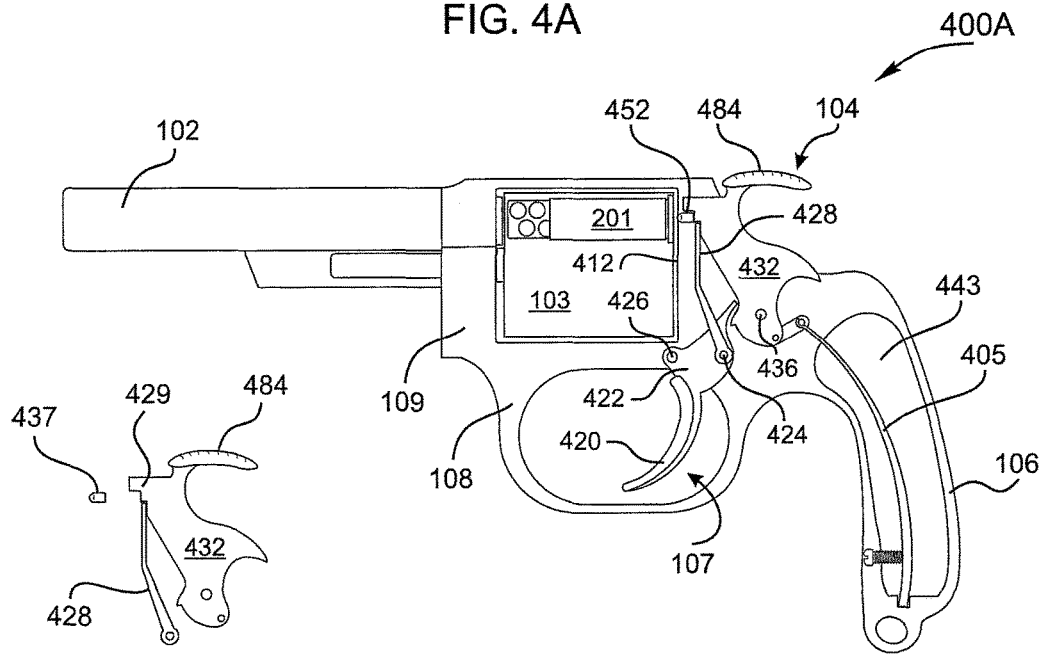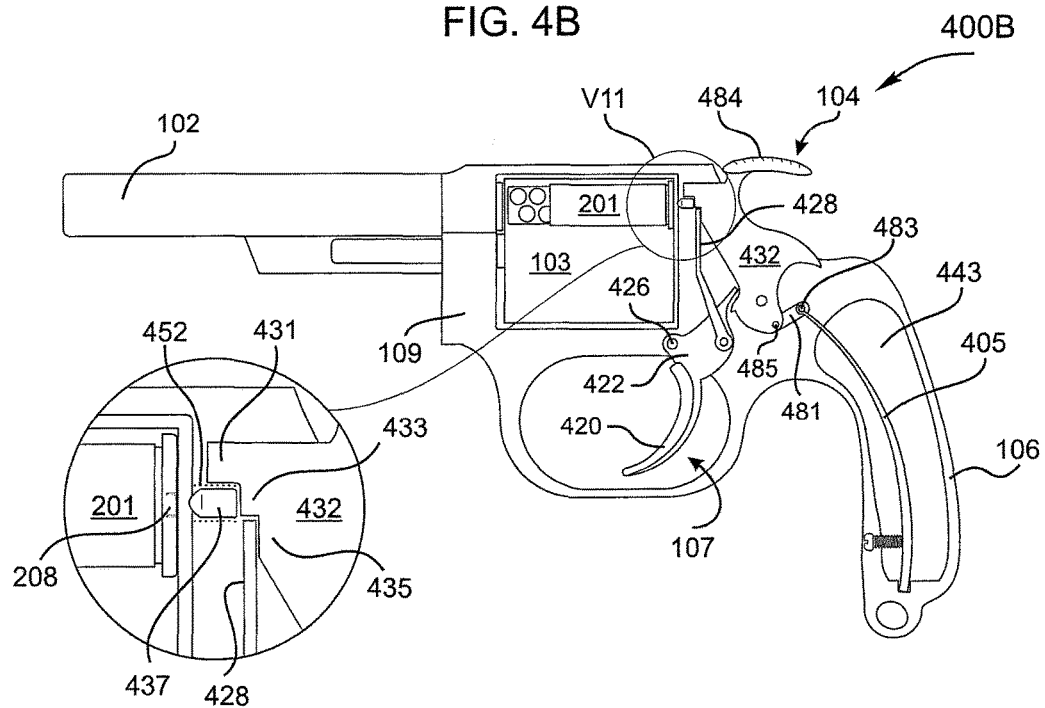

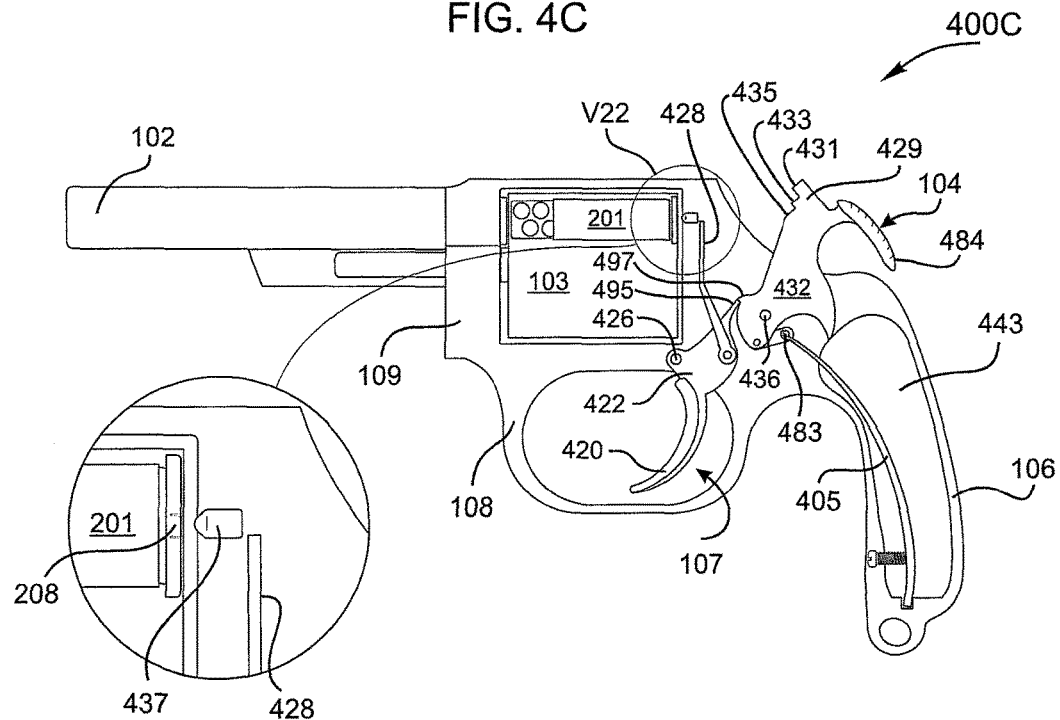
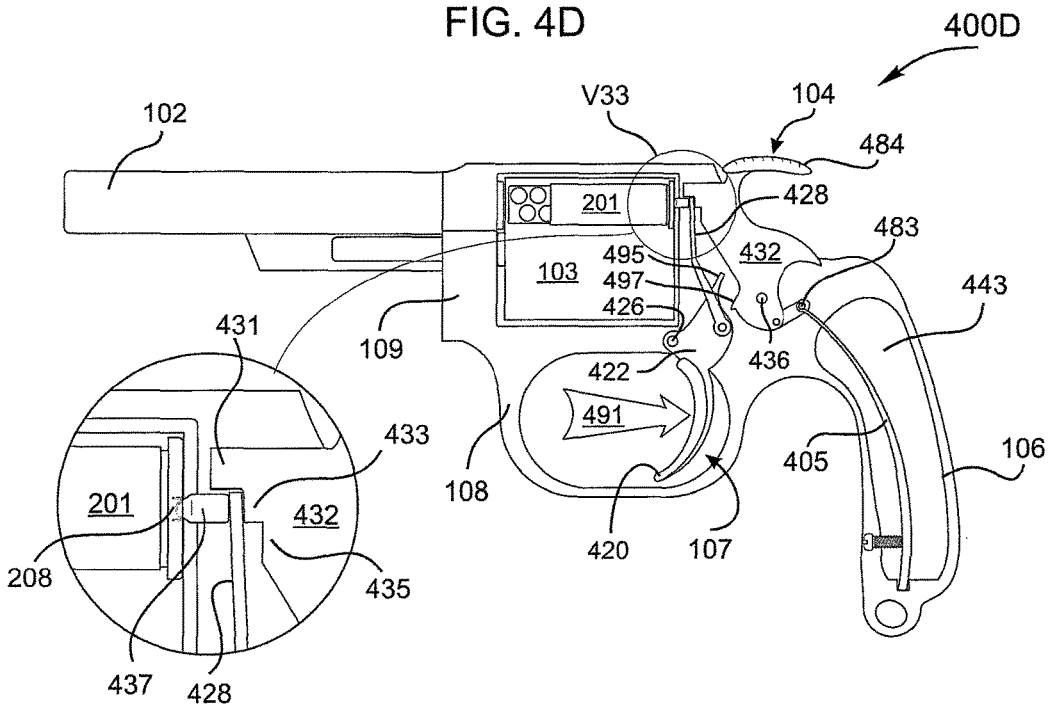

| Dimension | Nominal | Maximum | Minimum |
|---|---|---|---|
| αMAX1 | 35 degrees | 40 | 30 |
| BID1 | 0.38 inches | .46 | .30 |
| BWT1 | >0.2 inches | .25 | |
| ℓ1 | 0.75 inches | .90 | .60 |
| TDMAX1 | 0.16 inches | .19 | .13 |

| Dimension | Nominal | Maximum | Minimum |
|---|---|---|---|
| α MAX2 | 120 degrees | 140 | 100 |
| BID2 | 0.38 inches | .46 | .30 |
| BWT2 | >0.48 inches | .58 | |
| ℓ2 | 2.25 inches | 2.75 | 1.75 |
| TDMAX2 | 0.24 inches | .30 | .18 |

FIG. 7D
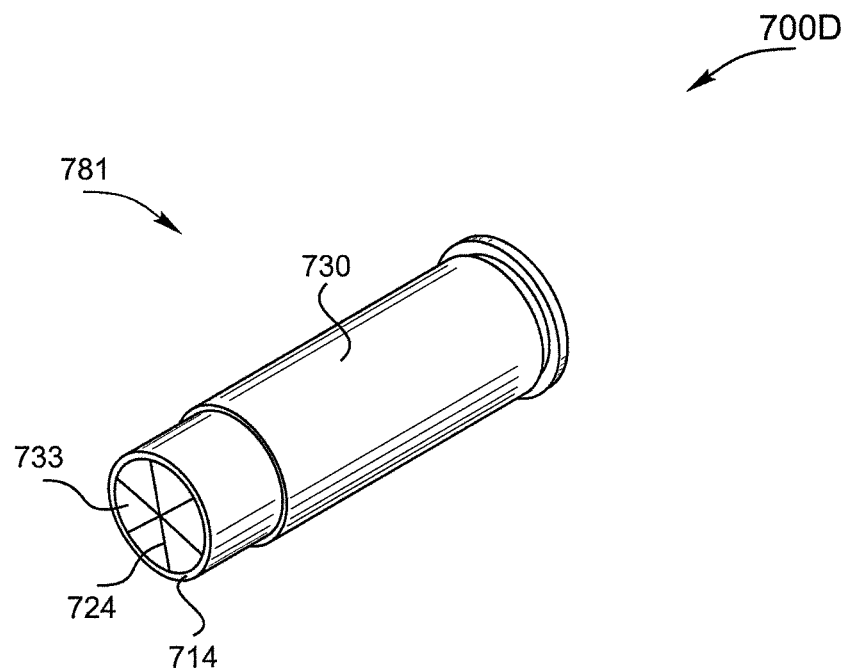
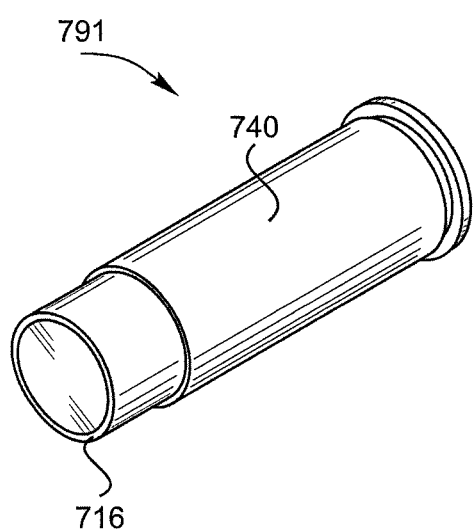

| | 38 Caliber Cartridge | | |
|---|---|---|---|
| | Composition | Quantity | Comment |
| Propellant Load 1 | Fast burning double base powder: e.g., Bullseye® (Alliant) Red Dot® (Alliant) | About 2 grains | Reduces likelihood of coral reef damage, ≤110dB sound level. |
| Shot Load 1 | Non-lead shot, e.g., tungsten alloy shot such as Hevi-Shott (Ballistic Products) | About ten (10) U.S. BB size shot (0.18 inches) | |
| Propellant Load 2 | Composition same as Propellant Load 1 | Between 2 and 5 grains | Loads over 5 grains may increase likelihood of coral damage |
| Shot Load 2 | Composition same as Shot Load 1 | A mix of U.S. BB size shot (0.18 inches) and No. 2 shot (0.15 inches) | |
| Propellant Load 3 | Composition same as Propellant Load 1 | Between 1.5 and 2 grains | De minimis coral damage, non-lethal to humans, below 110dB sound level. |
| Shot Load 3 | Composition same as Propellant Load 1 | A mix of U.S. No. 3 shot (0.14 inches) and U.S. BB shot (0.18 inches) with about 12 pellets per shell. | |
| Sealant | Adhesive or sealant, for example an anaerobic sealant such as Hernon® external ammunition sealant 59541 | As needed at casing mouth and casing primer cap cavity. | |

SPECIALIZED UNDERWATER PISTOL AND AMMUNITION FOR ERADICATING LIONFISH

PRIORITY AND INCORPORATION BY REFERENCE

This application is a continuation of U.S. patent application Ser. No. 15/094,896 filed Apr. 8, 2016 which claims the benefit of U.S. Prov. Pat. App. No. 62/148,695 filed Apr. 16, 2015 which are incorporated herein in their entirety and for all purposes.

BACKGROUND OF THE INVENTION

Governments and organizations, such as REEF[1] and the United States, are monitoring the growth of invasive fish species that endanger marine life native to domestic and other ocean waters. Where an invasive species' population grows and threatens survival of native marine life and the industries it supports, it is not surprising that affected governments act to control and/or eliminate the threat.

[1] REEF was founded in 1990, out of growing concern about the health of the marine environment, and the desire to provide the SCUBA diving community a way to contribute to the understanding and protection of marine populations. REEF achieves this goal primarily through its volunteer fish monitoring program, the REEF Fish Survey Project. REEF Headquarters, P.O. Box 370246; 98300 Overseas Hwy, Key Largo, Fla. 33037 USA Lionfish (*Pterois volitans*) in U.S. and other ocean waters have become just such a threat. Stretching from coastal waters in North Carolina to Brazil, Lionfish populations now threaten native fish and coral reefs that are home to thousands of fish and invertebrates essential to ocean health.

With no known marine predators, Lionfish first sighted in 2005 off the east coast of Florida now cover many if not most reefs in Florida's coastal waters. Supporting this rapid growth are Lionfish females that can produce millions of eggs each year with their hatchlings reaching nineteen inches in length and living for decades.

In response, some governments, such as those of the United States and Grand Cayman, have initiated campaigns to promote the eating of Lionfish. For example, they encourage divers and fisherman to help eliminate these fish from their waters and especially from their reefs.

However, little has been done to provide Lionfish hunters with modern fishing and diving gear adapted to the task.

FIELD OF INVENTION

This invention relates to the mechanical arts. In particular, an underwater firearm and suitable ammunition for use by divers is provided.

DISCUSSION OF THE RELATED ART

Underwater divers such as free divers and scuba divers have long hunted fish in ocean waters. However, the sophistication of their equipment for immobilizing fish has hardly moved beyond that known to Jules Verne and disclosed in his book *Twenty Thousand Leagues Under the Sea*, Circa 1870.

Nets and spears with barbed tips remain the primary fish immobilizers in use today. Nets are swung to entrap fish while spears are hurled to impale fish. In particular, spears have evolved from hand thrown spears to include throwers using rubber bands that are hand held, as in Hawaiian Slings, and rubber bands that are mounted on a trigger frame.

Less frequently used are single fire poles or "bang sticks" with a cartridge chamber at one end of the pole. These somewhat indiscriminant firearm-like poles can be thrust into the side of a fish to fire a single cartridge by forcing its primer against a firing pin and discharging a projectile, without the aid of an elongated barrel to guide the projectile.

None of this equipment is designed to eradicate the small and dangerous Lionfish. A Lionfish has sharp and slender venomous spines, located on the dorsal, anal, and pelvic fins. The handling of live fish captured in a net, or the removal of the fish from a spear increases the risk of injury from the spines resulting in typically non-fatal, but painful wounds.

Because diver safety is a primary concern, devices that can seriously wound a diver must be designed and handled in a manner that minimizes the risks presented by the device. Devices incorporating safety features preventing accidental activation or discharge while maintaining their effectiveness for their intended use are desirable.

Coral safety is yet another concern. Coral reefs are delicate living organisms that can be damaged by human contact. Divers must use care when diving in close proximity to coral reefs and in particular must use care when using devices to harvest fish adjacent to and within coral reefs. It is desirable that any such devices avoid damage to the coral reef by minimizing and/or preventing both direct and indirect contact with the reef.

While the above mentioned equipment is commonplace and only few may appreciate the benefits seeking improvements, there exists a need to develop an effective and rapid fire means for eradicating lionfish without unduly damaging coral or threatening a diver or bystanders with great bodily harm. This new device should operate at depths suited to divers without malfunction and its configuration should be suited to the diving environment and related diving equipment such as wet suit gloves. Embodiments of the specialized underwater pistol of the present invention address one or more these needs.

SUMMARY OF THE INVENTION

Embodiments of the invention provide a specialized underwater pistol and/or pistol ammunition. The ammunition includes plural shot pieces in each cartridge. The pistol includes barrel expansions to shape the pattern of the plural shot expelled from the pistol cartridge when the pistol is fired. Further, the pistol includes features that facilitate its use in an underwater environment.

BRIEF DESCRIPTION OF THE DRAWINGS

The present invention is described with reference to the accompanying figures. These figures, incorporated herein and forming part of the specification, illustrate embodiments of the present invention and, together with the description, further serve to explain the principles of the invention and to enable a person skilled in the relevant art to make and use the invention.

FIGS. 3A-E show coil spring embodiments of the pistol of FIG. 1.

FIGS. 3F-I show coil springs and spring assemblies for use with the pistol of FIG. 1.

FIG. 3J shows a table of spring properties related to the coil springs of FIGS. 3F-I.

FIGS. 3K-L show an aerodynamic trigger spur for use with the pistol of FIG. 1.

FIGS. 4A-D show leaf spring embodiments of the pistol of FIG. 1.

FIGS. 7A-E show components of the cartridge of FIG. 2.

DETAILED DESCRIPTION OF PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

For ease of reading, applicant typically mentions the number of a particular annotated item only once in each paragraph. And, where a number is mentioned, it typically refers to the preceding noun phrase and not an interposed prepositional phrase. For example, "The left side of the arch 111 . . . " directs the reader to look in a related figure for the arch left side which bears the number 111. On occasion, applicant may use a phrase like "The left side 111 of the arch 110" where clarity suggests a need exists to distinguish the arch 110 from the left side of the arch 111.

Figure 1:
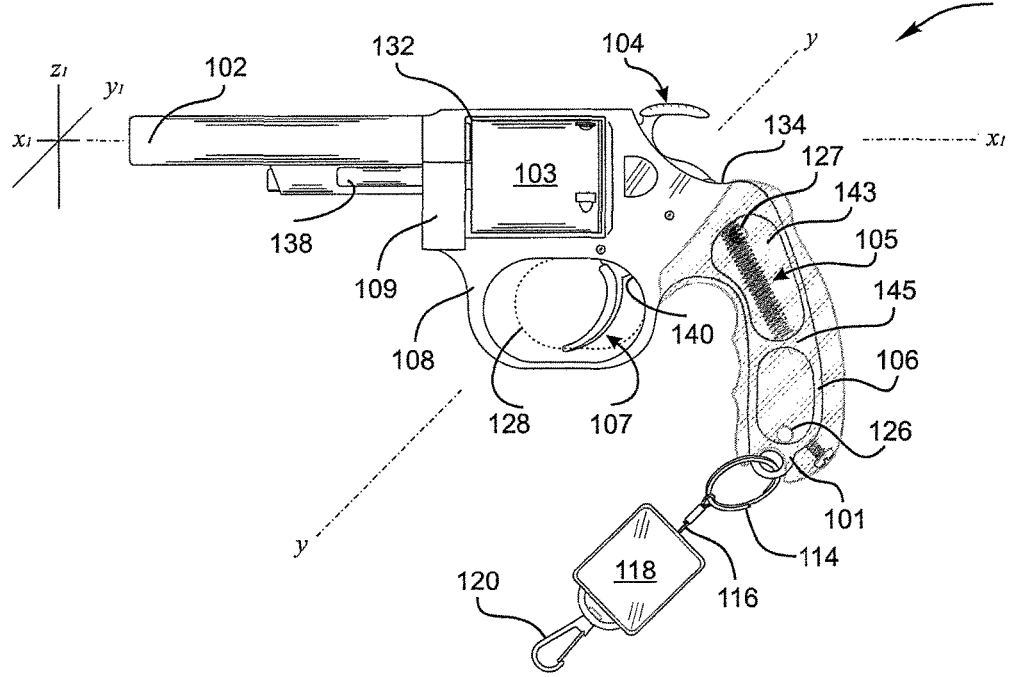
FIG. 1 shows a specialized underwater pistol of the present invention.
Figure 2:
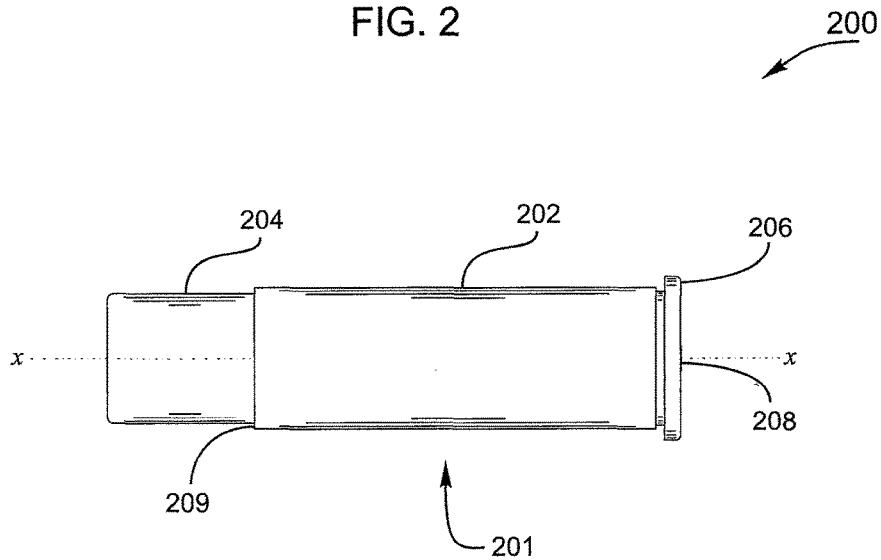
FIG. 2 shows a pistol cartridge for use with the pistol of FIG. 1.

FIGS. 1 and 2 show the firearm or pistol 100 and ammunition or a cartridge 200 to be fired in the pistol.

As seen in FIG. 1, the pistol 100 includes a frame 109 and a barrel 102. The barrel may be integral with or removable from the frame. A barrel centerline x1-x1 defines a longitudinal pistol axis with transverse axes y-y and y1-y1 about perpendicular thereto.

A magazine or cylinder 103 rotatable about a longitudinal axis parallel to the x1-x1 axis and for holding plural cartridges 200 is inserted in a cylinder aperture 132 of the frame 109. The aperture is located between the barrel 102 and a hammer assembly 104. In various embodiments, the magazine rotates about a longitudinal shaft 138 to bring successive cartridges into alignment x1-x1 between the hammer assembly and the barrel. In some embodiments, the magazine can be loaded when it is moved to one side of the aperture. And, in some embodiments, the cylinder is without flutes to better withstand cartridge firing pressures. In an embodiment, the cylinder holds five (5) cartridges.

The hammer assembly 104 or a part thereof is rotatable about a transverse axis and is mounted within a frame slot 134 between a frame handle 106 and the magazine 103. Interoperating with the hammer assembly is a trigger assembly 107 or part thereof that is rotatable about a transverse axis and mounted within a frame slot 140 between the frame handle and the magazine. In various embodiments, a trigger guard 108 extends at least partially around a portion of the trigger assembly.

The trigger guard 108 is enlarged as compared with that of a conventional pistol. See for example the dashed line 128 indicating the location of a conventional trigger guard. In various embodiments, the trigger guard 108 provides 2, 3, 4, or 5 times the open area for accessing the trigger as compared with a conventional trigger guard.

Firing the pistol requires that the hammer assembly 104 or a part thereof be moved with force toward a cartridge 200 in the magazine 103 that is aligned with the barrel 102. Energy storage for this operation is frequently provided by a spring such as a coil or leaf spring (spring 105 shown). As seen, such an energy storage device in the form of a coil spring 105 may be located at least partially within a handle void 143 between a spring base or handle bridge 145 and the trigger assembly 104.

In various embodiments the pistol includes attachment means for securing the pistol. Securement means may include one or more of an eyelet such as a pistol handle eyelet 101, an eyelet attachment such as a ring through the eyelet 114, a line such as a cable attached to the ring 116, a line or cable retrieving reel 118, and a personal fastener such as a spring type fastener 120 affixed to the reel.

In an embodiment, the pistol of FIG. 1 may be a single action pistol wherein the firing mechanism includes a hammer, trigger, and spring parts whose operation requires that the hammer be cocked before pulling the trigger will fire a cartridge. In an alternative embodiment, the pistol of FIG. 1 may be a double action pistol wherein the firing mechanism includes hammer, trigger, and spring parts that will fire a cartridge when the trigger is pulled without having previously cocked the hammer.

Pistol parts that are exposed to pressure generated by a fired cartridge, in particular the pistol barrel 102, may typically be made from non-corrosive metals such as stainless steel and/or titanium and/or other suitable materials known to skilled artisans. Selected pistol parts that are not exposed to pressure generated by a fired cartridge, for example the pistol frame 106, may be made from non-corrosive metal(s) and/or polymers. Exemplary polymers include plastics such as high density polyethylene ("HDPE"), composites such as carbon and glass composites, and/or other suitable materials known to skilled artisans.

FIG. 2 shows an exemplary cartridge 200 for use with the pistol. As shown, a .38 caliber cartridge casing 202 extends between a casing base 206 and a casing mouth 209. Inserted in the casing base is a primer cap 208 for ignition by the hammer assembly 104. Various embodiments include a shot sleeve 204 inserted in the casing mouth.

Casing materials include metals such as corrosion resistant metals that exclude iron and/or have alloying components that are corrosion resistant. In particular, brass or brass alloy material(s) may be used.

Figure 3A:
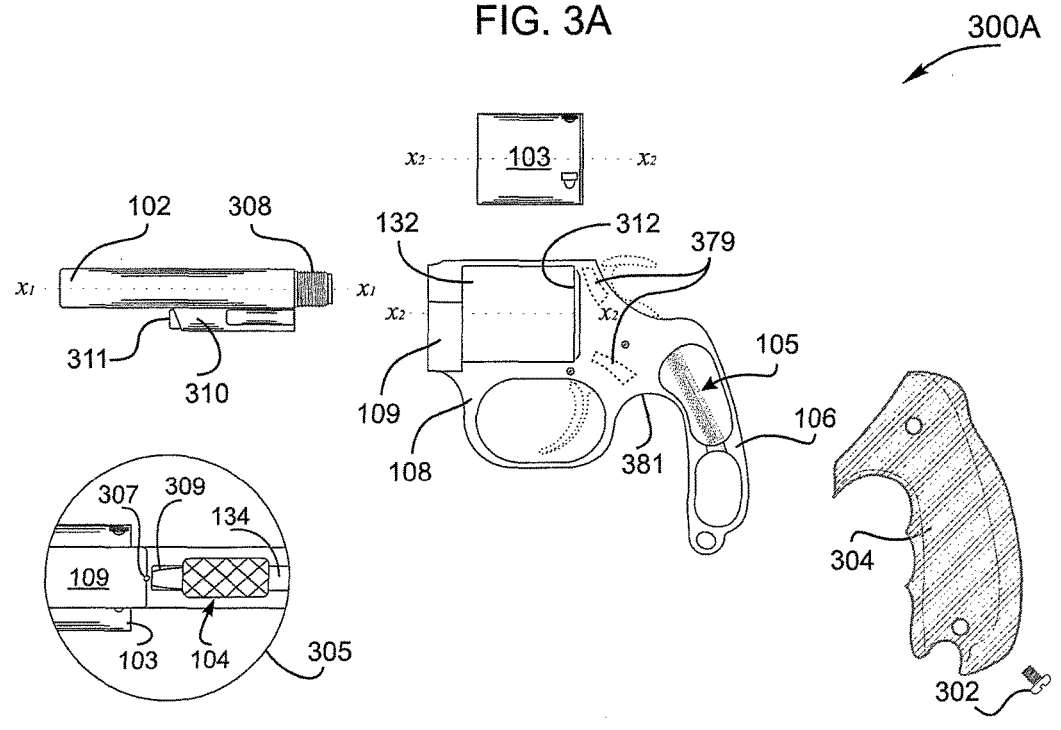

FIG. 3A shows an exploded view 300A of an embodiment of the pistol of FIG. 1. Parts including the barrel 102, frame 109, and magazine 103 are shown.

The barrel 102 is shown with a threaded end 308 for fitment to the pistol frame 109. In some embodiments, a sighting or pointing device such as laser sighting device is fitted with the barrel 102. For example, a laser sighting device may be inserted in a somewhat tubular structure subposed with respect to the barrel. As seen in the figure, a forward end of a cylinder shaft sleeve 310 houses an exemplary sighting device 311.

In various embodiments, the handle is interposed between a handle grip or grips 304 such as polymer or plastic grip secured by one or more screws 302. And, in various embodiments, the grips are designed to be grasped by a gloved hand, such as a hand gloved with a diver's neoprene wetsuit glove. Cleaning ports 126, 127 may provide means for any of draining, flushing, and lubricating pistol 100 internals.

Notably, the pistol may use various cartridges and pistol cartridges. For example, cartridges such as .32 caliber, .35 caliber, .38 caliber, .44 caliber, .45 caliber, and the like.

FIGS. 3B-E show partial cross-sections 300B-E of a single action embodiment of the pistol of FIG. 1 having a coil trigger spring. Main parts include the barrel 102, frame 109, and magazine 103 holding a cartridge 201. Also shown are the trigger 107 and hammer 104 assemblies.

The trigger assembly 107 is for interoperating with the hammer assembly 104 to selectively deliver a hammer strike to a cartridge primer cap 208. In various embodiments, the hammer strike may be delivered to the primer cap via a hammer mounted firing pin (not shown) or by a frame mounted firing pin 337. Whether the pistol uses a frame mounted firing pin or hammer mounted firing pin, a cylinder aperture back face 312 (see FIG. 3A) provides an opening 352 (see FIG. 3D) for the firing pin.

Figure 3B:
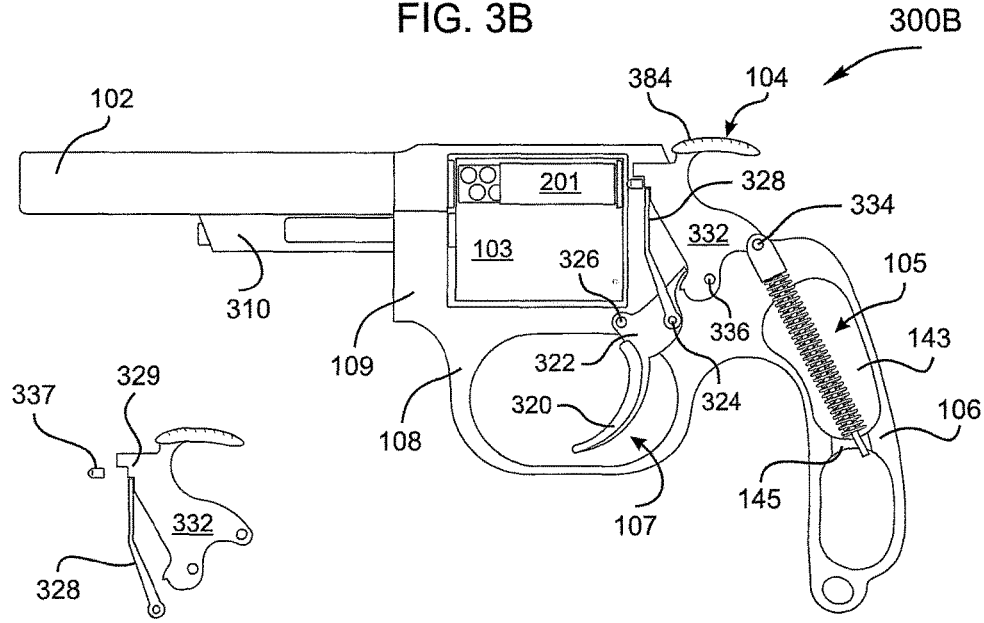

As shown in FIG. 3B, the trigger assembly 107 includes a trigger cam 322 and a transfer bar 328. Extending from the cam into the trigger guard 108 is a trigger pull 320 for rotating the cam about a trigger pivot 326. The transfer bar is rotatably affixed to a transfer bar pivot 324 on the cam such that when the trigger is pulled, the cam attempts to raise the transfer bar. In some embodiments, the trigger pull better accommodates a gloved finger by presenting a wide surface at its finger interface, for example a surface width of ¼ to ⅜ inch. And in some embodiments, a trigger guard enclosing the trigger pull better accommodates the gloved finger by providing a finger insertion circle 303 (see FIG. 3C) or partial circle in front of the trigger pull of about 1.0 to 1.3 inches in diameter.

The hammer assembly 104 includes a hammer cam 332 and a spring means such as a coil spring assembly 105. Extending from an upper portion of the hammer cam is a hammer spur 384 for grasping with a thumb and rotating the hammer cam about a hammer pivot 336. Forward of the hammer spur is a hammer face 329 for, among other things, striking the transfer bar 328 which in turn strikes the firing pin 337. In some embodiments, the hammer spur better accommodates a gloved finger by presenting a wide surface at its thumb interface, for example a surface width of ¼ to ⅜ inch.

The spring assembly 105 is substantially located in a handle void 143 with an upper end rotatably affixed to a spring pivot 334 on the hammer cam. A spring of the assembly spring is compressed between the hammer cam 332 and a spring base or handle bridge 145 when the hammer spur 384 is pulled toward the handle 106.

In some embodiments, the hammer cam 332 is made from stainless steel and has a leading edge at the hammer face 329 that is chamfered or tapered to form a drag reducing aerodynamic foil. And in some embodiments, the pistol frame 109, barrel 102 or an extension thereof minimize or close a gap 393 (see FIG. 3C) between the magazine 103 and the barrel for minimizing gas bubbles in this zone when the pistol is fired.

FIGS. 3C-E show operation of the pistol mechanism 300C-E.

In FIG. 3C, the pistol is uncocked V1 and protected against accidental firing. In particular, a stand-off of the hammer face 331 rests against the frame 109 which prevents the hammer from rotating toward the cartridge 201. Because the trigger 320 is not pulled, the transfer bar 328 is not raised, but is stopped by a hammer face rest 335. In this configuration, a hammer face striker 333 cannot move forward to drive the firing pin 337 against the cartridge primer cap 208.

In FIG. 3D, the pistol is cocked V2 and protected against accidental firing. Here, the hammer spur 384 and cam 332 are rotated toward the handle 106 until a peripheral shoulder of the hammer cam 397 catches on an extended pawl 395 of the trigger cam 322. When the catch is set in this manner, a spring 343 of the spring assembly 105 is compressed as evidenced by a spring guide rod 342 that is advanced into a second handle void 315. As in FIG. 3C, the trigger pull 320 is not rotated and the transfer bar 328 is not raised. In this configuration, even if the shoulder and pawl catch is released allowing the hammer to move toward the cartridge 201, the hammer face stand-off 331 stops hammer cam rotation before the hammer face striker 333 reaches the firing pin 337.

In FIG. 3E, the pistol is fired V3. In particular, the pistol is intentionally fired when the trigger pull 320 is rotated by a force 391 toward the handle 106. This trigger pull rotates the trigger cam 322 and raises the transfer bar 328. It also releases the shoulder 397 and pawl 395 catch causing the hammer spur 384 and cam 332 to be rotated toward the cartridge 201 by the relaxing spring 343. Unlike FIGS. 3C,D, the transfer bar 328 is now raised and effectively extends the length of the firing pin 337 such that the hammer stand-off 331 no longer prevents the hammer striker 333 from delivering its blow, albeit indirectly via the transfer bar, to the firing pin.

FIGS. 3F-G show a first coil spring assembly 300F-G. In FIG. 3F, an exploded view of the spring assembly 105 shows a guide rod 342 for insertion in a coil spring 343. A fastener such as an eyelet 341 is affixed to an upper end of the guide rod and as discussed above, a pivot 334 of the hammer cam 332 is for rotatably engaging the fastener or eyelet. In various embodiments, spring assembly materials of construction provide one or both of a base material and a coating or plating, one or both of which are resistant to the corrosive effects of water and to salt water in particular.

In FIG. 3G, the first coil spring assembly is shown in an assembled state. Here, the guide rod 342 is inserted through the spring and the spring abuts the fastener 341 at an upper end of the guide rod.

Exemplary spring assembly materials include polymers such as Teflon®, zinc and zinc alloys, brass and brass alloys, marine duty metals such as admiralty brass, stainless steel, and other suitable materials known to those skilled in the art. In one embodiment, stainless steel parts are used. In another embodiment, a polymer coated spring is used. In yet another embodiment, a brass or brass alloy plated spring is used.

FIGS. 3H-I show a second spring assembly 300H-I.

In FIG. 3H, an exploded view of an alternative spring assembly 105 shows a guide rod 342 for insertion in a coaxially arranged spring pair 345 that includes a first coil spring 343 and a second coil spring 344. A fastener such as an eyelet 341 is affixed to an upper end of the guide rod and as discussed above, a pivot 334 of the hammer cam 332 is for rotatably engaging the fastener or eyelet. In various embodiments, spring assembly materials of construction provide one or both of a base material and a coating or plating, one or both of which are resistant to the corrosive effects of water and to salt water in particular.

In FIG. 3I, the second coil spring assembly is shown in an assembled state. Here, the guide rod 342 is inserted through the nested spring pair 345 and the spring pair abuts the fastener 341 at an upper end of the guide rod. Exemplary spring assembly and/or spring materials include those mentioned above in connection with the first spring assembly.

The spring assembly (e.g., 300G and 300I) stores enough energy when the pistol is cocked to deliver sufficient power when the shoulder 397 and pawl 395 catch is released by a trigger pull to fire the cartridge. In particular, the spring is capable of moving the hammer face striker 333 to deliver a sufficiently forceful blow to the transfer bar 328 and firing pin 337 such that the primer cap 208 is ignited.

Turning now to spring performance, difficulties encountered with firing a conventional pistol underwater include drag effects (increases with fluid density) on moving parts such as the hammer cam 332 and piston/cylinder effects (increases with fluid viscosity) when water is flushed from the hammer slot 134 upon entry of the hammer cam. For example, when the trigger is pulled 391, the hammer cam 332 moves (drag retards motion) toward the cartridge 201 and moves into the hammer slot 134 (piston/cylinder effect retards motion) of the pistol frame 109.

Pistol geometry and interaction of the effects that impede hammer cam 332 motion complicate analysis of the increase in spring energy and power required to equate hammer cam motion in water with hammer cam motion in air. However, it can be expected that more robust spring(s) will be required and further that pistol designs can reduce the required spring energy and power by reducing the projected area of moving parts subject to drag and by increasing the flow area available for flushing the hammer slot 134.

FIG. 3J presents a spring constant table 300J with estimated spring constants. Where a single spring with a spring constant 1 k (lbf/inch) fires a cartridge in air, experiments show that using a replacement spring with a spring constant of approximately 2 k to 2.5 k+/−0.5 k (lbf/inch) suffices for operation in water.

And, where a single spring with a spring constant 1 k (lbf/inch) fires a cartridge in air, experiments show that replacing this spring with two springs such as inner and outer nested springs with a total spring constant of 2 k to 2.5 k+/−0.5 k (lbf/inch), evenly divided between the springs as shown in FIG. 3J or otherwise, suffices for operation in water.

As suggested above, the estimated changes to spring constants for pistol operation underwater, such as those shown in table 300J, may be reduced by increasing the cross sectional area of pistol frame opening(s) and/or adding ports such as pistol frame ports available for flushing water from a pistol frame interior when the hammer cam 332 rotates into the hammer slot 134.

In various embodiments water relief ports are used. For example, ports may be located on opposed sides of the pistol, that is sides of the pistol that are substantially parallel to plane x1-z1. And, in various embodiments, the generally circular or rectangular ports are designed to minimize pressure drop, for example with a venturi-like shape and/or chamfered inlet and exit edges.

For example, FIG. 3A shows a sidewall flushing port(s) 379 in the pistol frame 109 that provides an additional means of dewatering the interior of the pistol frame. Exemplary flushing ports may be located in the pistol frame sidewalls, in the pistol frame stirrup 381, and in portions of the handle/grip 106/304 that are not blocked by a user's hand. In addition, the hammer slot opening 134 may be enlarged.

Similar water relief or flushing ports may be used in the x1-y1 plane. See for example, the port 307 forward of the hammer 104 shown in the partial pistol top view 305 of FIG. 3A.

And, as suggested above, the estimated changes to spring constants for pistol operation underwater, such as those shown in table 300J, may be reduced by reducing the drag on moving pistol parts such as the hammer spur 384.

For example, FIGS. 3K-L illustrate an aerodynamic trigger spur 300K-L. In particular, FIG. 3K shows show selected portions of an uncocked embodiment of the pistol of FIG. 1. As seen, an arc circle A3K with a radius R3K is centered on the hammer cam pivot 336 and the hammer spur 384 lies along the arc circle.

FIG. 3L shows selected portions of a cocked embodiment of the pistol of FIG. 1. Here, the hammer spur 384 lies along the arc circle A3K. Moreover, when the pistol is cocked by rotating the hammer cam 332, the spur which is connected to the cam moves along the arc circle.

In a first set of embodiments, the hammer spur 384 has a radius of curvature about equal to that of an arc circle centered on a hammer cam pivot 336 and lies substantially along a concave or inner portion of the arc circle such that the hammer spur does not protrude outside or in cases does not protrude substantially outside the arc circle over its normal range of motion.

In a second set of embodiments, a peripheral tip 370 of the hammer face 329 lies within an arc circle over its normal range of motion. Some of these embodiments may combine features of the first set of embodiments.

In a third set of embodiments, the entirety of the hammer cam 332 lies within the arc circle over its normal range of motion.

In various embodiments, the hammer cam 332 has a maximum radius from its pivot 336 described by the hammer spur 384, the hammer face tip 370, or another portion of the hammer cam. Reducing this radius reduces drag on the hammer cam. In particular, skilled artisan's will appreciate that for a given angular velocity of the hammer cam 332, the velocity of a particular point on the hammer cam is determined by the magnitude of the radius extending from the hammer cam pivot 336 to the point of interest ($V=r*\omega$). And, as is known to skilled artisans, drag varies with projected area and velocity squared.

Given the above and taking the example of a hammer spur 384 that describes the maximum hammer cam 332 radius of revolution, it is seen that reducing the hammer spur radius also reduces its velocity with consequent reductions in drag. Further, such radius reductions will typically reduce a hammer spur area perpendicular to its direction of motion (i.e., the projected area) with consequent reductions in drag.

Drag and/or hydraulic resistance acting on other ones/portions of the pistol's moving parts may also be reduced. For example, leading portions 309 of the hammer assembly 104 that operate in the frame slot 134 may be tapered as shown in the pistol partial top view 305 of FIG. 3A. And, for example, the firing pin 337 may have, along its length, fluted sides and/or through-holes.

FIGS. 4A-D show partial cross-sections 400A-D of a single action embodiment of the pistol of FIG. 1 having a leaf type trigger spring.

As seen in FIG. 4A, parts include the barrel 102, frame 109, and magazine 103 holding a cartridge 201. Also shown are trigger 107 and hammer 104 assemblies. The trigger assembly 107 is for interoperating with the hammer assembly 104 to selectively deliver a hammer strike to a cartridge primer cap 208. In various embodiments, the hammer strike may be delivered to the primer cap via a hammer mounted firing pin (not shown) or by a frame mounted firing pin 437 (see FIG. 4B). Whether the pistol uses a frame mounted firing pin or hammer mounted firing pin, a cylinder aperture back face 412 provides an opening 452 for the firing pin.

The hammer assembly 104 includes a hammer cam 432 and a spring means such as a leaf type spring or spring assembly 405. Extending from an upper portion of the hammer cam is a hammer spur 484 for grasping with a thumb and rotating the hammer cam about a hammer pivot 436. Forward of the hammer spur is a hammer face 429 for, among other things, striking the transfer bar 428 which in turn strikes a firing pin 437.

As seen in FIG. 4B, the leaf type spring 405 is substantially located in a frame grip void 443 with an upper end rotatably affixed to a link 481 at a link pivot 483, an opposite end of the link being attached to a pivot mounted on the hammer cam 485. The leaf type spring is flexed by attachment to the link 481 which moves toward the trigger guard 108 when the hammer spur 484 is pulled toward the handle 106.

The trigger assembly 107 includes a trigger cam 422 and a transfer bar 428. Extending from the cam into the trigger guard 108 is a trigger pull 420 for rotating the cam about a trigger pivot 426. The transfer bar is rotatably affixed to a transfer bar pivot 424 on the cam such that when the trigger is pulled, the cam attempts to raise the transfer bar.

FIGS. 4B-D show operation of the pistol 400B-400D.

In FIG. 4B, the pistol is uncocked V11 and protected against accidental firing. In particular, a stand-off of the hammer face 431 rests against the frame 109 which prevents the hammer from rotating toward the cartridge 201. Because the trigger 420 is not pulled, the transfer bar 428 is not raised, but is stopped by a hammer face rest 435. In this configuration, a hammer face striker 433 cannot move forward to drive the firing pin 437 against the cartridge primer cap 208.

In FIG. 4C, the pistol is cocked V22 and protected against accidental firing. Here, the hammer spur 484 and cam 432 are rotated toward the handle 106 until a peripheral shoulder of the hammer cam 497 catches on an extended pawl 495 of the trigger cam 422. When the catch is set in this manner, the leaf spring 405 is flexed as evidenced by a pulling of the spring and link pivot 483 toward the trigger guard 108 and a consequent bending or flexing of the spring. As in FIG. 4B, the trigger pull 420 is not rotated and the transfer bar 428 is not raised. In this configuration, even if the shoulder and pawl catch is released allowing the hammer to move toward the cartridge 201, the hammer face stand-off 431 stops hammer cam rotation before the hammer face striker 433 reaches the firing pin 437.

In FIG. 4D, the pistol is fired V33. In particular, the pistol is intentionally fired when the trigger pull 420 is rotated by a force 491 toward the handle 106. This trigger pull rotates the trigger cam 422 and raises the transfer bar 428. It also releases the shoulder 497 and pawl 495 catch causing the hammer spur 484 and cam 432 to be rotated toward the cartridge 201 by the relaxing spring 405. Unlike FIGS. 4B,C, the transfer bar 428 is now raised and effectively extends the length of the firing pin 437 such that the hammer stand-off 431 no longer prevents the hammer striker 433 from delivering its blow, albeit indirectly via the transfer bar, to the firing pin.

FIGS. 5A-D show pistol barrel cross-sections and data 500A-D.

Figures 5A, 5B:
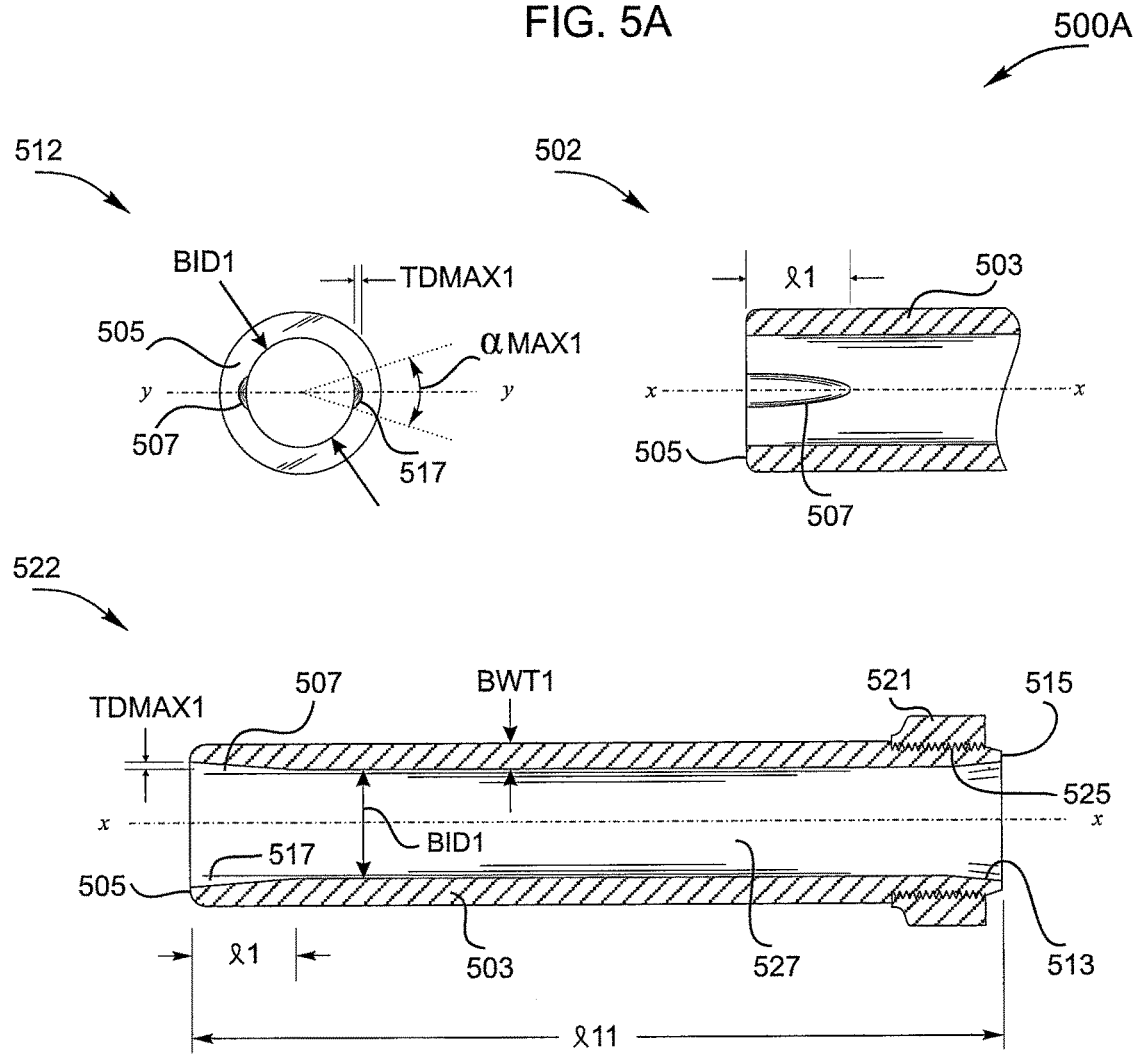
FIGS. 5A-D show barrels for use with the pistol of FIG. 1.

In FIG. 5A, a first barrel 500A having a length l11 is shown in a barrel top view 522, a rotated partial side view 502, and muzzle end view 512. As seen in the barrel top view 522, the barrel has a somewhat cylindrical wall 503, an entry end 515, and a muzzle end 505. External screw threads 525 at the barrel entry end provide for engaging the barrel with mating threads of a pistol frame 521. As shown, some embodiments of the barrel include a converging barrel entry section or forcing cone 513.

Notably, the barrel 500A is without rifling, for example having a smooth or substantially smooth bore. However, as seen in the muzzle end view 512, the barrel includes two substantially equatorial or side-to-side expansions 507, 517 of a nominal barrel inner diameter "BID1" that provides a means for patterning shot or pellets expelled from the barrel when a cartridge 201 is fired. The barrel top view 522 and the barrel rotated partial side view 502 indicates an expansion length l1. In some embodiments the barrel expansions may be integral with the barrel, may be tapered expansions, and/or may proceed from the muzzle end of the barrel 505 and diverge in the direction of shot fired from a cartridge.

As seen in the muzzle end view 512 and the barrel rotated partial side view 502, the expansions may be formed as troughs 507, 517 that extend parallel to a barrel centerline x-x. In an embodiment, trough depth tapers from a maximum trough depth "TDMAX1" at the muzzle end 505 to a minimum or zero trough depth "TDMIN1" at a distance "l1" within the barrel bore 527, the distance l1 substantially equal to a trough length. In some embodiments, at distance l1 a barrel wall thickness "BWT1" reaches a maximum value. And, in an embodiment, the troughs present a flattened elliptical or partial elliptical shape when viewing the barrel from the muzzle end 505.

The radial extent of the trough measured about the barrel centerline x-x may taper from a maximum trough angle "αMAX1" at the muzzle end 505 to a minimum or zero trough angle "αMIN1" at a distance "l1" within the barrel bore 527.

In various embodiments, the trough forms a somewhat circular, oval, or elliptical shape about the barrel axis x-x and comes to or tends to a point where it ends at a distance "l1" within the barrel bore. In an embodiment, the trough surface may appear as the inside of a cone split in half along its axis (i.e., a "split cone") and may point toward the barrel entry 515.

In an exemplary embodiment, a barrel without rifling includes equatorial troughs tapered along the barrel length as described above. And, in an embodiment, a barrel without rifling includes equatorial troughs tapered along the barrel length as described above and has one or more of the dimensions BID1, TDMAX1, αMAX1 and BWT1 shown in the table 500B of FIG. B. In various embodiments, the barrel wall thickness BWT1 is calculated to withstand underwater firing pressures that exceed air firing pressures because water must be forced from the barrel when the pistol is fired.

Figure 5C:
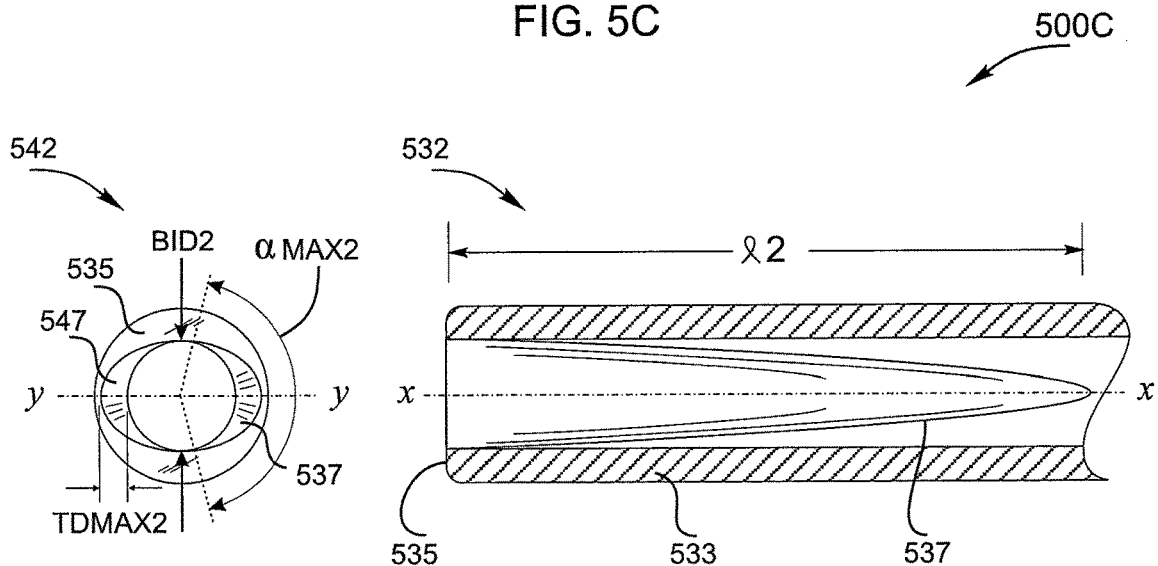
Figure 5D:
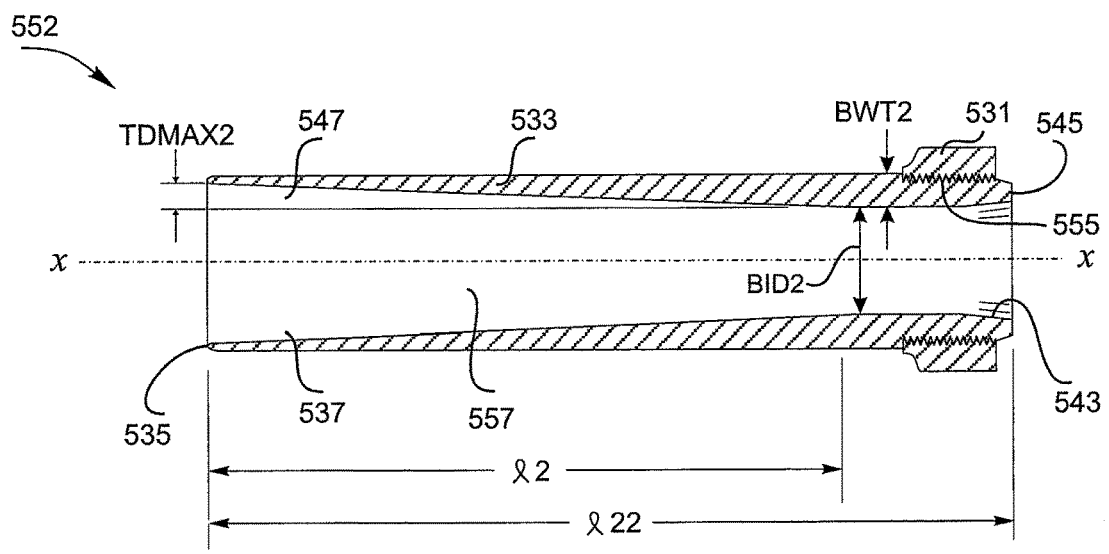

In FIG. 5C a second barrel 500C having a length l22 is shown in a barrel top view 552, a rotated partial side view 532, and muzzle end view 542. As seen in the barrel top view 552, the barrel has a cylindrical wall 533, an entry end 545, and a muzzle end 535. External screw threads 555 at the barrel entry end provide for engaging the barrel with mating threads of a pistol frame 531. As shown, some embodiments of the barrel include a converging barrel entry or forcing cone section 543.

Notably, the barrel is without rifling, for example having a smooth or substantially smooth bore. However, as seen in the muzzle end view 542, the barrel includes two substantially equatorial or side-to-side expansions 537, 547 of a nominal barrel inner diameter "BID2" that provides a means for patterning shot or pellets expelled from the barrel when a cartridge 201 is fired. The barrel top view 552 and the barrel rotated partial side view 532 indicate an expansion length l2. In some embodiments the barrel expansions may be integral with the barrel, may be tapered expansions, may proceed from the muzzle end of the barrel 535 and diverge in the direction of shot fired from a cartridge, and/or may extend past a midpoint of the barrel length.

As seen in the muzzle end view 542 and the barrel rotated partial side view 532, the expansions may be formed as troughs 537, 547 that extend parallel to a barrel centerline x-x. In an embodiment, trough depth tapers from a maximum trough depth "TDMAX2" at the muzzle end 535 to a minimum or zero trough depth "TDMIN2" at a distance "l2" within the barrel bore 557, the distance l2 substantially equal to a trough length. In some embodiments, at distance l2 a barrel wall thickness "BWT2" reaches a maximum value.

The radial extent of the trough measured about the barrel centerline x-x may taper from a maximum trough angle "αMAX2" at the muzzle end 535 to a minimum or zero trough angle "αMIN2" at a distance "l2" within the barrel bore 557.

In various embodiments, the trough forms a somewhat circular, oval, or elliptical shape about the barrel axis x-x and tends to a point where it ends at a distance "l2" within the barrel bore. In an embodiment, the trough surface may appear as the inside of a cone split in half along its central axis (i.e., a "split cone") and may be pointed toward the barrel entry 545. And, in an embodiment, the troughs present a flattened elliptical or partial elliptical shape when viewing the barrel from the muzzle end 535.

In an exemplary embodiment, a barrel without rifling includes equatorial troughs tapered along the barrel length as described above. And, in an embodiment, a barrel without rifling includes equatorial troughs tapered along the barrel length as described above and has one or more of the dimensions BID2, TDMAX2, αMAX2 and BWT2 shown in the table 500D of FIG. D. In various embodiments, the barrel wall thickness BWT2 is calculated to withstand underwater firing pressures that exceed air firing pressures because water must be forced from the barrel when the pistol is fired.

As skilled artisans will appreciate, it is primarily the barrel expansions and not the barrel length that provides a distinctive shot pattern shape. Therefore, barrel lengths may be reasonably varied for reasons including shot pattern dimensions at a particular distance to a target. For example, where trough lengths allow, barrel lengths may include lengths of two (2) to six (6) inches. In selected embodiments, barrel lengths are about 2.0, 2.5, 2.75, 3.0, 3.5, and 4.0 inches. Notably, barrels may be shortened to the point of leaving unburned propellant. Barrels may also be lengthened to the point of excessive internal barrel pressures due to increased amounts of water that must be purged from the barrel on firing the pistol. In a preferred embodiment, the barrel length is about 2.0 inches.

Figure 6A:
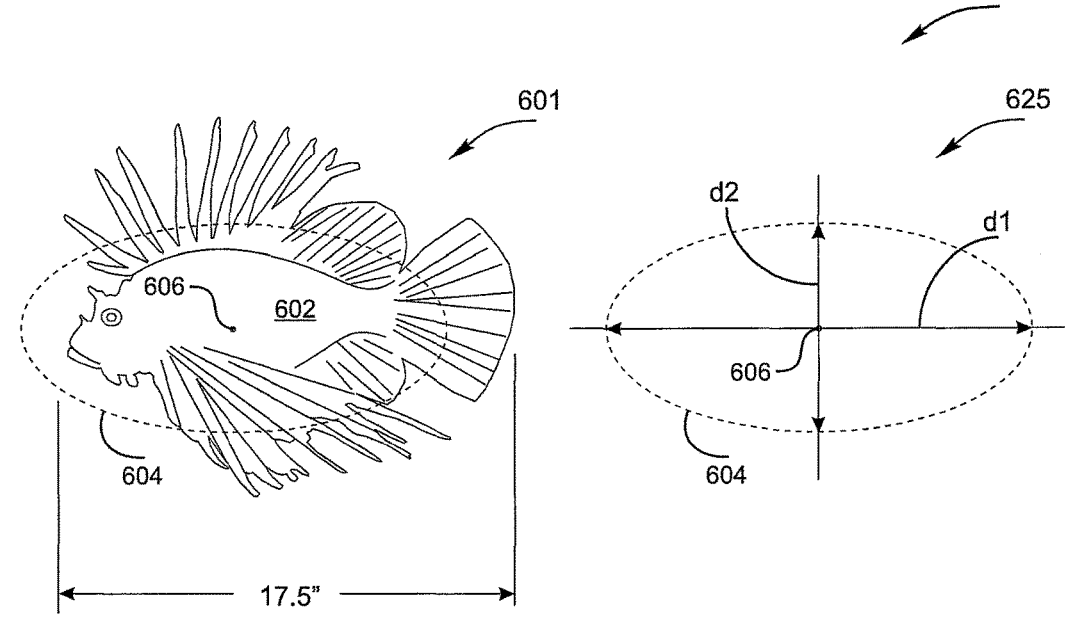
FIGS. 6A-B show Lionfish targeting using the pistol of FIG. 1.

FIG. 6A shows a Lionfish and a Lionfish shot pattern 600A. In a first view 601, a shot pattern 604 is superimposed on the side of a Lionfish 602. As seen, the shot pattern substantially covers a central portion of the Lionfish body and is about centered 606 on the body of the fish. A typical Lionfish lengthwise dimension of 17.5 inches is shown.

In a second view 625, the shot pattern 604 is shown apart from the fish. The shot pattern is shaped like an oval or ellipse with a major dimension "d1" extending from the Lionfish's head to its tailfin. A minor dimension "d2" extends between ventral and dorsal extremes of the Lionfish body.

Notably, embodiments of the pistol 100 of the present invention are configured to produce an oval or elliptical shot pattern. For example, barrel expansions similar to those of FIGS. 5A-D can be expected to produce an oval or elliptical shot pattern with a major axis d1 that crosses the barrel longitudinal axis X1 and is about perpendicular to the plane X1, Z1 of the pistol (see e.g., FIG. 1). Embodiments of the specialized underwater pistol 100 produce at a firing distance of 12-18 inches shot patterns with a major dimension of 5 to 12 inches and a minor dimension of 2 to 8 inches. And, embodiments of the specialized underwater pistol produce at a firing distance of 12-18 inches shot patterns with minor to major dimension ratios of about ⅜, ½, ⅝, and ¾.

Figure 6B:
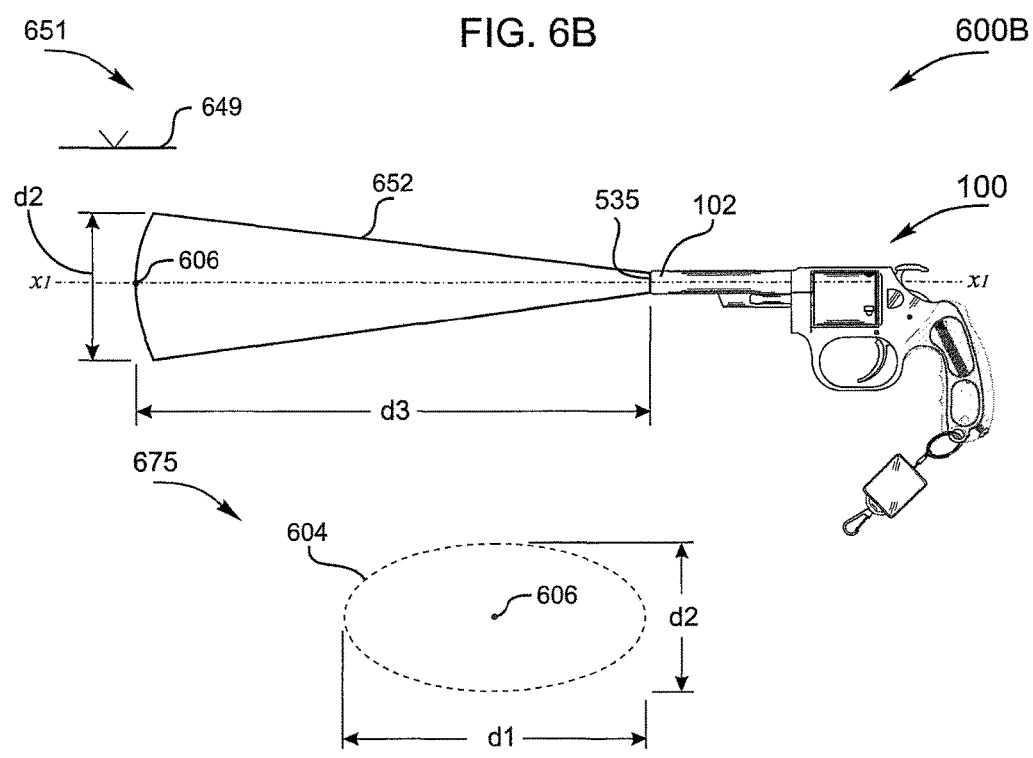

FIG. 6B illustrates a pistol with barrel 102 expansions firing an oval or elliptical shot pattern 600B. In a first view 651, the pistol 100 fires a cartridge 201 loaded with shot. Upon leaving the muzzle 535, the shot spread about a central axis x1-x1 as they travel a distance "d3." As seen, the shot trajectories spread relative to each other 652 before striking a target such as a Lionfish at the center of an oval or ellipse oval 606.

In a second view 675, the pistol shot pattern is shown to fall within an oval or ellipse 604 having major d1 and minor d2 dimensions that match or substantially match a central body portion of a Lionfish. In some embodiments, the pistol is for firing underwater at depths 649 as great as one hundred and thirty (130) feet. And, in some embodiments, the pistol is for firing underwater at depths 649 as great as two hundred (200) feet.

FIGS. 7A-E describe an exemplary shot type cartridge 700A-700E for use with the pistol of FIG. 1.

Figure 7A:
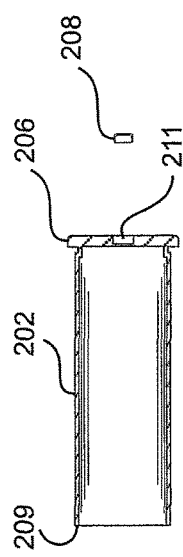

FIG. 7A shows a cartridge casing 202. The casing has a base 206 at one end and a casing mouth 209 at an opposite end. A center fire primer cap cavity in the base 211 is for receiving a primer cap 208.

Figure 7B:
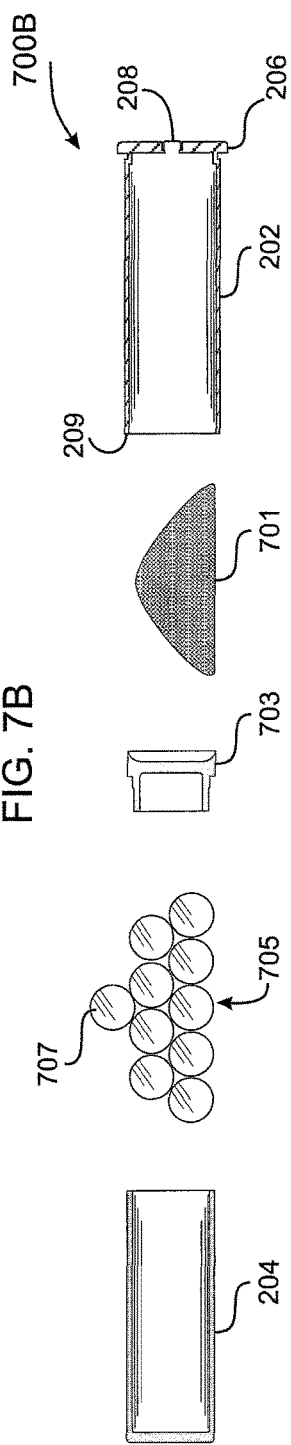

FIG. 7B shows an exploded view of cartridge components 700B. In this embodiment, a casing 202 fitted with a primer cap 208 receives at least four components. As shown, a sabot 703 separates a propellant charge 701 from plural ones 707 of a group of shot 705. A shot sleeve 204 is for insertion in the casing mouth 209. In some embodiments, the sabot provides a wading and/or obturation trapping expanding propellant bases behind the projectiles when the pistol is fired.

Figure 7C:
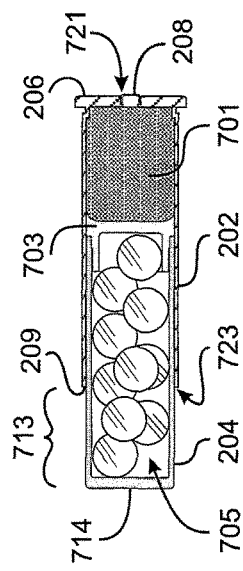

FIG. 7C shows an assembled cartridge 700C. In particular, the sabot 703 holds the propellant 701 against the primer cap 208 and casing base 206 while the shot sleeve 204 which is inserted in the casing mouth 209 contains the group of shot 705. In some embodiments, the shot sleeve interengages not only with the casing 202, but also with the sabot as shown in the figure. And, in some embodiments, the shot sleeve protrudes 713 from the casing mouth 209. In various embodiments, a waterproofing agent such as a waterproofing coating or insert is applied and/or inserted at the cartridge/primer cap external interface 721 and at the cartridge/shot sleeve interface 723.

FIG. 7D shows shot sleeve closed end embodiments 700D. In a first embodiment 781, the shot sleeve end 714 terminating an adjacent cylindrical slot sleeve wall 730 is in the form of a disk or a circular disk. The disk is formed by pie shaped segments 733 having segment boundaries 724. The boundaries are score lines made in a plastic or polymer material forming the shot sleeve 204. In various embodiments, a thickness "t1" of the disk is selected for one or more of frangible characteristics, resistance to hydrostatic pressure, affixment to an adjacent cylindrical wall of the sleeve 730 and manufacturing ease. In various embodiments, the score lines provide for weak points along which the disc fractures when the cartridge is fired.

In a second embodiment 791, the shot sleeve end 716 terminating an adjacent cylindrical shot sleeve wall 740 is again in the form of a disk or a circular disk. Unlike the first embodiment, this disk has no score lines. In various embodiments, a thickness "t2" of the disk is selected for one or more of frangible characteristics, resistance to hydrostatic pressure, affixation to an adjacent cylindrical wall of the shot sleeve 740, and manufacturing ease.

Cartridge component properties may be varied depending on application particulars such as cartridge caliber, depth of water where firing takes place, targeting oval or ellipse 604 size, targeting distance d3, and shot selection.

FIG. 7E shows a table of cartridge component properties 700E. In particular, the propellant loads and shot loads mentioned are consistent with providing an oval or elliptical underwater shot pattern when the cartridge is fired from a barrel similar to the barrel of FIG. 5A. This shot pattern is similar to that of FIG. 6B.

In the table 700E, components included with an exemplary .38 caliber cartridge are described. Two different propellant loads are mentioned, each of which uses a fast burning propellant or powder such as a double base powder. Exemplary propellants are Bullseye® and Red Dot® powders manufactured by Alliant. The quantity of propellant in propellant load 1 is two (2) grains while in propellant load 2 it is greater than two (2), but less than five (5) grains.

Propellant quantity influences, among other things, shot range, shock waves, and firing noise. Experimental work indicates that two grain propellant loads result in a satisfactory 110 dB of firing noise while minimizing damage to nearby coral formation which may be the background against which a Lionfish is shot. This same work suggests an upper limit of five grains to limit firing noise and attendant coral damaging shock waves. Notably, it is estimated that the shot will travel a maximum of five to ten feet underwater before their kinetic energy is lost.

In the table 700E, three different loads are presented. Load 1 includes a propellant and shot in a pistol cartridge such as a .38 caliber or a .35 caliber pistol cartridge. Propellant load 1 is about 2 grains of a fast burning double base powder such as Bullseye® or Red Dot®. Shot load 1 is about 10 U.S. BB size non-lead shot such as a tungsten alloy, e.g. tungsten, nickel, steel alloy.

Load 2 includes a propellant and shot in a pistol cartridge such as a .38 caliber or a .35 caliber pistol cartridge. Propellant load 2 is between 2 and 5 grains of a fast burning double base powder such as Bullseye® or Red Dot®. Shot load 2 is a mix of U.S. BB shot and U.S. No. 2 shot. As above, embodiments include non-lead shot such as a tungsten alloy, e.g. tungsten, nickel, steel alloy.

Load 3 includes a propellant and shot in a pistol cartridge such as a .38 caliber or a .35 caliber pistol cartridge. Propellant load 3 is between 1.5 and 2 grains of a fast burning double base powder such as Bullseye® or Red Dot®. Shot load 3 is a mix of about 12 pellets including a combination of U.S. BB shot and U.S. No. 3 shot. As above, embodiments include non-lead shot such as a tungsten alloy, e.g. tungsten, nickel, steel alloy.

High grain loads are not required to eradicate lionfish. Notably, low grain loads and especially grain loads of about 2 grains and below provide an effective charge for eradicating lionfish while assuring the specialized underwater pistol 100 is essentially non-lethal to humans whether underwater or out of the water.

Also mentioned in Table 7E is an exemplary cartridge sealant. As shown, embodiments may use an adhesive or sealant, for example an anaerobic sealant such as a Hernon® ammunition sealant, see e.g., Hernon 59541 external ammunition sealant. In various embodiments, an anaerobic water sealant is applied at an interface between the primer cap and the cartridge casing and at an interface between the shot carrier and the cartridge casing, the sealant for preventing the ingress of water into the cartridge casing.

Figure 8:
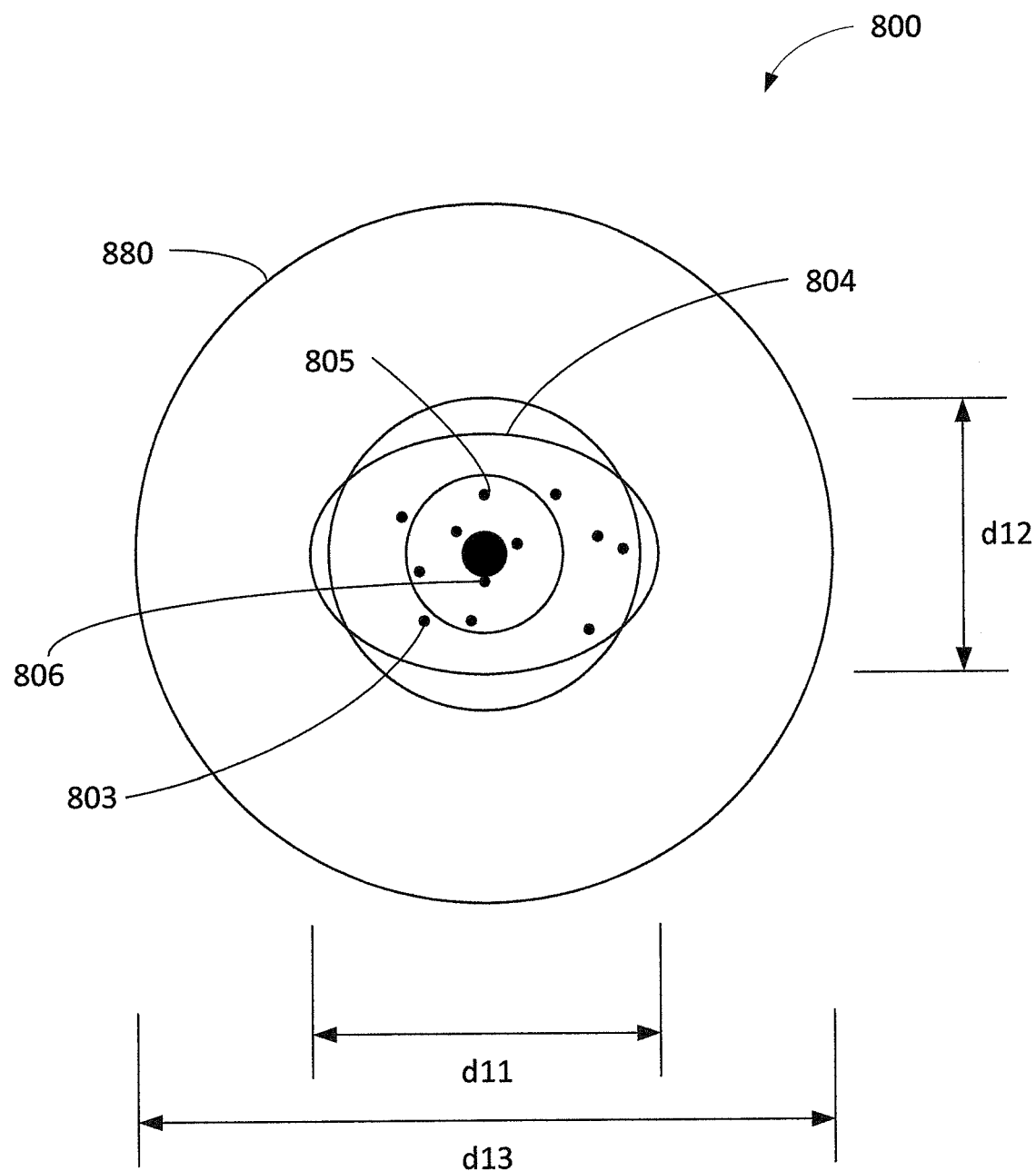
FIG. 8 shows a target impacted by shot fired from a specialized underwater pistol of the present invention.

FIG. 8 shows an exemplary target 800. This target was impacted by a cartridge fired from a .38 caliber specialized underwater pistol. Particulars of the configuration are: 3 inch pistol barrel similar to FIG. 5A, load 3 from FIG. 7E above, and a firing distance of 12-18 inches.

The target diameter d13 is twelve (12) inches and the oval shot pattern 804 has minor d12 by major d11 dimensions of about 4 inches by 7 inches. As seen, ten pieces of shot passed through the target 880 arrayed around the target center 806. Larger shot holes in the target 803 result from larger shot (U.S. BB) while smaller shot holes 805 result from smaller shot (U.S. No. 3). While the barrel chamfer provides an oval shot pattern, skilled artisans will appreciate that the size of the shot pattern varies with other parameters such as increases in firing distance which lead to larger shot patterns.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A specialized underwater pistol for use by divers in eradication of Lionfish in salt water, the pistol comprising:
   a pistol frame, a single action firing mechanism, a barrel having a generally cylindrical barrel wall encircling a barrel axis, a free end, and a rotatable magazine; the pistol for firing five or more shot pieces from a cartridge designed to fit within the magazine;
   the barrel having a substantially smooth bore but for opposed barrel troughs leading from the free end and formed by bore expansions along lines about parallel to the barrel axis;
   the firing mechanism including a hammer cam and a trigger cam; and,
   the hammer cam including a spur that lies along and operates along an arc of an arc circle centered on a hammer cam pivot;
   wherein a shot pattern elongated with respect to an axis perpendicular to a longitudinal barrel axis is formed by the barrel troughs when the pistol is fired and shot pieces are expelled from the barrel.

2. A specialized underwater pistol for use by divers in eradication of Lionfish in salt water, the pistol comprising:
   a pistol frame, a barrel having a generally cylindrical barrel wall encircling a barrel axis, a free end, and a rotatable magazine;
   the pistol for firing five or more shot pieces from a cartridge designed to fit within the magazine; and,
   the barrel having a substantially smooth bore but for opposed barrel troughs leading from the free end and formed by bore expansions along lines substantially parallel to the barrel axis;
   wherein a shot pattern elongated with respect to an axis perpendicular to a longitudinal barrel axis is formed by the barrel troughs when the pistol is fired and shot pieces are expelled from the barrel.

3. The specialized underwater pistol of claim 2 wherein a minimum barrel wall thickness is designed to withstand pressures developed within the barrel when the pistol is fired and water within the barrel is expelled from the barrel.

4. The specialized underwater pistol of claim 2 further comprising flushing ports in opposed sidewalls of the pistol frame, the flushing ports for at least partially dewatering the pistol when a rotation of a hammer cam displaces water from an interior of the pistol frame.

5. The specialized underwater pistol of claim 2 wherein a trigger cam has a trigger pull substantially enclosed in a trigger guard defining a finger insertion circle with a diameter of one inch or more, the trigger pull having a width of ⅜ inch or more for being grasped by a diver's gloved finger.

6. The specialized underwater pistol of claim 2 for firing .35 caliber cartridges having a primer cap, a double base propellant, a sabot, and a plastic shot carrier extending from a mouth of a cartridge casing, the shot carrier having a blind end that is a frangible disk.

7. The specialized underwater pistol of claim 6 wherein an external face of the frangible disk has score lines along which the disk fails when the cartridge is fired.

8. The specialized underwater pistol of claim 7 further including an anaerobic water sealant applied at an interface between the primer cap and the cartridge casing and at an interface between the shot carrier and the cartridge casing, the sealant for preventing ingress of water into the cartridge casing.

9. A specialized underwater pistol for use by divers in eradication of Lionfish in salt water, the pistol comprising:
  a pistol frame, a barrel having a generally cylindrical barrel wall, a free end, and a rotatable magazine;
  the pistol for firing shot pieces from a cartridge designed to fit within the magazine; and,
  a minimum barrel wall thickness designed to withstand pressures developed within the barrel when the pistol is fired and water within the barrel is expelled from the barrel.

10. The specialized underwater pistol of claim 9 wherein a shot pattern elongated with respect to an axis perpendicular to a longitudinal barrel axis is formed by barrel troughs leading from the free end when the pistol is fired and shot pieces are expelled from the barrel.

11. The specialized underwater pistol of claim 1 wherein the barrel inside diameter increases in the direction that fired shot travel.

* * * * *